US012375853B2

(12) United States Patent
Holman et al.

(10) Patent No.: US 12,375,853 B2
(45) **Date of Patent: *Jul. 29, 2025**

(54) AUDIO ENCODING WITH COMPRESSED AMBIENCE

(71) Applicant: Apple Inc., Cupertino, CA (US)

(72) Inventors: Tomlinson Holman, Palm Springs, CA (US); Christopher T. Eubank, Santa Barbara, CA (US); Joshua D. Atkins, Los Angeles, CA (US); Soenke Pelzer, San Jose, CA (US); Dirk Schroeder, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,933

(22) Filed: Jan. 26, 2024

(65) Prior Publication Data

US 2024/0163609 A1 May 16, 2024

Related U.S. Application Data

(63) Continuation of application No. 17/360,825, filed on Jun. 28, 2021, now Pat. No. 11,930,337, which is a (Continued)

(51) Int. Cl.

*H04R 5/027* (2006.01)
*G10L 19/16* (2013.01)
(Continued)

(52) U.S. Cl.

CPC ............ *H04R 5/027* (2013.01); *G10L 19/167* (2013.01); *G10L 21/0216* (2013.01); (Continued)

(58) Field of Classification Search

CPC ................ G10L 19/008; G10L 19/167; G10L 2021/02082; G10L 2021/02166; (Continued)

(56) References Cited

U.S. PATENT DOCUMENTS

| | | | |
|---|---|---|---|
| 6,351,733 | B1 | 2/2002 | Saunders et al. |
| 9,807,498 | B1 | 10/2017 | Harmke et al. |

(Continued)

FOREIGN PATENT DOCUMENTS

| | | | |
|---|---|---|---|
| CN | 1427987 | A | 7/2003 |
| CN | 1703736 | A | 11/2005 |

(Continued)

OTHER PUBLICATIONS

International Search Report and Written Opinion for International Application No. PCT/US2020/032274 mailed Aug. 11, 2020, 13 pages.

(Continued)

*Primary Examiner* — Lun-See Lao
(74) *Attorney, Agent, or Firm* — Aikin & Gallant, LLP

(57) ABSTRACT

An audio device can sense sound in a physical environment using a plurality of microphones to generate a plurality of microphone signals. Clean speech can be extracted from microphone signals. Ambience can be extracted from the microphone signals. The clean speech can be encoded at a first compression level. The ambience can be encoded at a second compression level that is higher than the first compression level. Other aspects are also described and claimed.

20 Claims, 5 Drawing Sheets

Related U.S. Application Data continuation of application No. PCT/US2020/055774, filed on Oct. 15, 2020.

(60) Provisional application No. 62/927,244, filed on Oct. 29, 2019.

(51) Int. Cl.

| | |
|---|---|
| ***G10L 21/0208*** | (2013.01) |
| ***G10L 21/0216*** | (2013.01) |
| ***H04R 3/00*** | (2006.01) |
| ***H04R 3/04*** | (2006.01) |
| ***H04R 5/033*** | (2006.01) |
| ***H04R 5/04*** | (2006.01) |

(52) U.S. Cl.

CPC ............... *H04R 3/005* (2013.01); *H04R 3/04* (2013.01); *H04R 5/033* (2013.01); *H04R 5/04* (2013.01); *G10L 2021/02082* (2013.01); *G10L 2021/02166* (2013.01); *H04R 2420/07* (2013.01)

(58) Field of Classification Search

CPC ..... G10L 21/0216; G10L 25/84; H04R 1/406; H04R 2420/07; H04R 3/005; H04R 3/04; H04R 5/027; H04R 5/033; H04R 5/04; H04S 2400/15; H04S 2420/01; H04S 2420/03

USPC .................................. 381/92, 18–26; 700/94

See application file for complete search history.

(56) References Cited

U.S. PATENT DOCUMENTS

| | | | |
|---|---|---|---|
| 11,523,244 | B1 | 12/2022 | Meade et al. |
| 11,930,337 | B2 * | 3/2024 | Holman ................ G10L 19/008 |
| 2005/0163323 | A1 | 7/2005 | Oshikiri |
| 2005/0267746 | A1 | 12/2005 | Jelinek et al. |
| 2008/0008342 | A1 * | 1/2008 | Sauk ....................... H04S 1/002 381/315 |
| 2008/0281602 | A1 | 11/2008 | Van Schijndel et al. |
| 2009/0040289 | A1 * | 2/2009 | Hetherington ......... H04N 7/142 348/E7.078 |
| 2009/0094037 | A1 * | 4/2009 | Gao ........................ G10L 19/26 704/500 |
| 2009/0111507 | A1 * | 4/2009 | Chen ................... H04M 1/6008 381/92 |
| 2011/0060599 | A1 | 3/2011 | Kim et al. |
| 2014/0086414 | A1 | 3/2014 | Vilermo et al. |
| 2015/0356978 | A1 * | 12/2015 | Dickins ............... G10L 19/0208 704/226 |
| 2016/0337779 | A1 | 11/2016 | Davidson et al. |
| 2016/0345116 | A1 | 11/2016 | Yen et al. |
| 2017/0078819 | A1 | 3/2017 | Habets et al. |
| 2018/0206038 | A1 | 7/2018 | Tengelsen et al. |
| 2018/0232471 | A1 | 8/2018 | Schissler et al. |
| 2019/0116448 | A1 | 4/2019 | Schmidt et al. |
| 2019/0189144 | A1 | 6/2019 | Dusan |
| 2020/0043468 | A1 * | 2/2020 | Willett ..................... G06N 5/01 |
| 2020/0105283 | A1 * | 4/2020 | Fischer ............... G10L 19/0212 |
| 2021/0089263 | A1 * | 3/2021 | Milne ..................... G06F 3/165 |
| 2024/0129687 | A1 * | 4/2024 | Neukam .................. G01H 7/00 |

FOREIGN PATENT DOCUMENTS

| | | | |
|---|---|---|---|
| CN | 105874820 | A | 8/2016 |
| CN | 105900457 | A | 8/2016 |
| CN | 106716978 | A | 5/2017 |
| CN | 107770718 | A | 3/2018 |
| CN | 109416585 | | 3/2019 |
| CN | 109564760 | | 4/2019 |
| WO | 2014146668 | | 9/2014 |

OTHER PUBLICATIONS

International Search Report and Written Opinion for International Application No. PCT/US2020/055774 mailed Jan. 22, 2021, 16 pages.

Hedau, Varsha, et al., "Thinking Inside the Box: Using Appearance Models and Context Based on Room Geometry," European Conference on Computer Vision, ECCV 2010, Sep. 1, 2010, 14 pages.

Schissler, Carl, et al., "Interactive Sound Propagation and Rendering for Large Multi-Source Scenes," ACM Trans. Graph. 36, 1, Article 2, Sep. 1, 2016, 12 pages.

Schissler, Carl, et al., "Interactive Sound Rendering on Mobile Devices using Ray-Parameterized Reverberation Filters," Mar. 1, 2018, 20 pages.

International Preliminary Report on Patentability for International Application No. PCT/US2020/032274 mailed Nov. 25, 2021, 8 pages.

International Preliminary Report on Patentability for International Application No. PCT/US2020/055774 mailed May 12, 2022, 10 pages.

Examination Report under section 18(3) for United Kingdom Application No. 2112963.0 mailed Jun. 30, 2022, 8 pages.

Notice of Preliminary Rejection for Korean Application No. 10-2021-7031988 mailed Oct. 31, 2022, 10 pages.

Notification of the First Office Action and Search Report for Chinese Application No. 2020800194513 mailed Nov. 28, 2022, 17 pages.

* cited by examiner

AUDIO ENCODING WITH COMPRESSED AMBIENCE

CROSS-REFERENCE TO RELATED APPLICATION

This application is a continuation of co-pending U.S. patent application Ser. No. 17/360,825, filed Jun. 28, 2021, which is a continuation of International Application No. PCT/US2020/055774 filed Oct. 15, 2020, which claims the benefit of U.S. Provisional Patent Application No. 62/927,244 filed Oct. 29, 2019, which is incorporated by reference herein in its entirety.

FIELD

One aspect of the disclosure herein relates to audio processing with compressed ambience.

BACKGROUND

Microphone arrays, which can be embedded in consumer electronic devices, can facilitate a means for capturing sound and rendering spatial (3D) sound. Signals captured by microphones can contain 3D acoustic information about space. 3D audio rendering can be described as the processing of an audio signal (such as a microphone signal or other recorded or synthesized audio content) so as to yield sound produced by a multi-channel speaker setup, e.g., stereo speakers, surround-sound loudspeakers, speaker arrays, or headphones.

Sound produced by the speakers can be perceived by the listener as coming from a particular direction or all around the listener in three-dimensional space. For example, one or more of such virtual sound sources can be generated in a sound program that will be perceived by a listener to be behind, above or below the listener, or panned from one side of the listener to another.

In applications such as a teleconference, extended reality, or other multi-user application, a first user can communicate to a second user with speech and visual information that shows the first user (or a representation of the first user) and the first user's physical environment. The second user can be immersed in the first user's physical environment.

SUMMARY

Audio signals can be captured by a microphone array in a physical setting or environment. Physical settings are those in the world where people can sense and/or interact without use of electronic systems. For example, a room is a physical setting that includes physical elements, such as, physical chairs, physical desks, physical lamps, and so forth. A person can sense and interact with these physical elements of the physical setting through direct touch, taste, sight, smell, and hearing.

Virtual sound sources can be generated in an extended reality environment or setting. In contrast to a physical setting, an extended reality (XR) setting refers to a computer-produced environment that is partially or entirely generated using computer-produced content. While a person can interact with the XR setting using various electronic systems, this interaction utilizes various electronic sensors to monitor the person's actions, and translates those actions into corresponding actions in the XR setting. For example, if a XR system detects that a person is looking upward, the XR system may change its graphics and audio output to present XR content in a manner consistent with the upward movement. XR settings may respect laws of physics to mimic physical settings.

Concepts of XR include virtual reality (VR) and augmented reality (AR). Concepts of XR also include mixed reality (MR), which is sometimes used to refer to the spectrum of realities from between physical settings (but not including physical settings) at one end and VR at the other end. Concepts of XR also include augmented virtuality (AV), in which a virtual or computer-produced setting integrates sensory inputs from a physical setting. These inputs may represent characteristics of a physical setting. For example, a virtual object may take on a color captured, using an image sensor, from the physical setting. Or, an AV setting may adopt current weather conditions of the physical setting.

Some electronic systems for implementing XR operate with an opaque display and one or more imaging sensors for capturing video and/or images of a physical setting. In some implementations, when a system captures images of a physical setting, and displays a representation of the physical setting on an opaque display using the captured images, the displayed images are called a video pass-through. Some electronic systems for implementing XR operate with a transparent or semi-transparent display (and optionally with one or more imaging sensors). Such a display allows a person to view a physical setting directly through the display, and also allows for virtual content to be added to the person's field of view by superimposing the content and over the physical setting. Some electronic systems for implementing XR operate with a projection system that projects virtual objects onto a physical setting. The projector may present a holograph onto a physical setting, or may project imagery onto a physical surface, or may project onto the eyes (e.g., retina) of a person, for example.

Electronic systems providing XR settings can have various form factors. A smart phone or tablet computer may incorporate imaging and display components to provide a XR setting. A head mount system may include imaging and display components to provide a XR setting. These systems may provide computing resources for providing XR settings, and may work in conjunction with one another to provide XR settings. For example, a smartphone or a tablet can connect with a head mounted display to provide XR settings. Or, a computer may connect with home entertainment components or vehicular systems to provide an on-window display or a heads-up display. Electronic systems providing XR settings may utilize display technologies such as LEDs, OLEDs, liquid crystal on silicon, a laser scanning light source, a digital light projector, or combinations thereof. Display technologies can employ substrates, through which light is transmitted, including light waveguides, holographic substrates, optical reflectors and combiners, or combinations thereof.

In one aspect of the present disclosure, a method performed by an audio device, includes: sensing sound in a physical environment using a plurality of microphones to generate a plurality of microphone signals; extracting clean speech from microphone signals; extracting ambience from the microphone signals; and encoding, in a bit stream, a) the clean speech in an encoded speech signal at a first compression level, and b) the ambience an encoded ambience signal at a second compression level that is higher than the first compression level. The ambience can be played back at the playback device to provide a more immersive experience. In such a manner, clean speech can be sent with a relatively high bit rate, e.g., 96 kB/sec, 128 kB/sec, or greater. Ambience audio, on the other hand, can have an equal or even much lower bit rate. The ambience is noise and/or sounds other than the speech, and can be compressed at a higher compression level to a much lower or equal bit rate than speech with less noticeable degradation in audio quality.

Additionally, or alternatively, one or more acoustic parameters that characterize the acoustic environment of the speaker are generated and encoded into the bit stream. This can be applied to the speech signal so that the speech sounds less dry.

Compression refers to reducing a number of bits that are needed to represent the underlying data (e.g., sound). Compressing data can improve storage capabilities, data transfer efficiency, and network bandwidth utilization. Compression level refers to how much data is compressed. For example, if an audio stream has a raw bit rate of 256 kB/sec, the audio stream can be encoded at a first compression level resulting in a bit rate of 128 kB/sec. If a higher compression level is used to encode the same audio stream, this can result in a bit rate of 96 kB/sec. This example is meant to illustrate application of differing compression levels and is not meant to be limiting.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
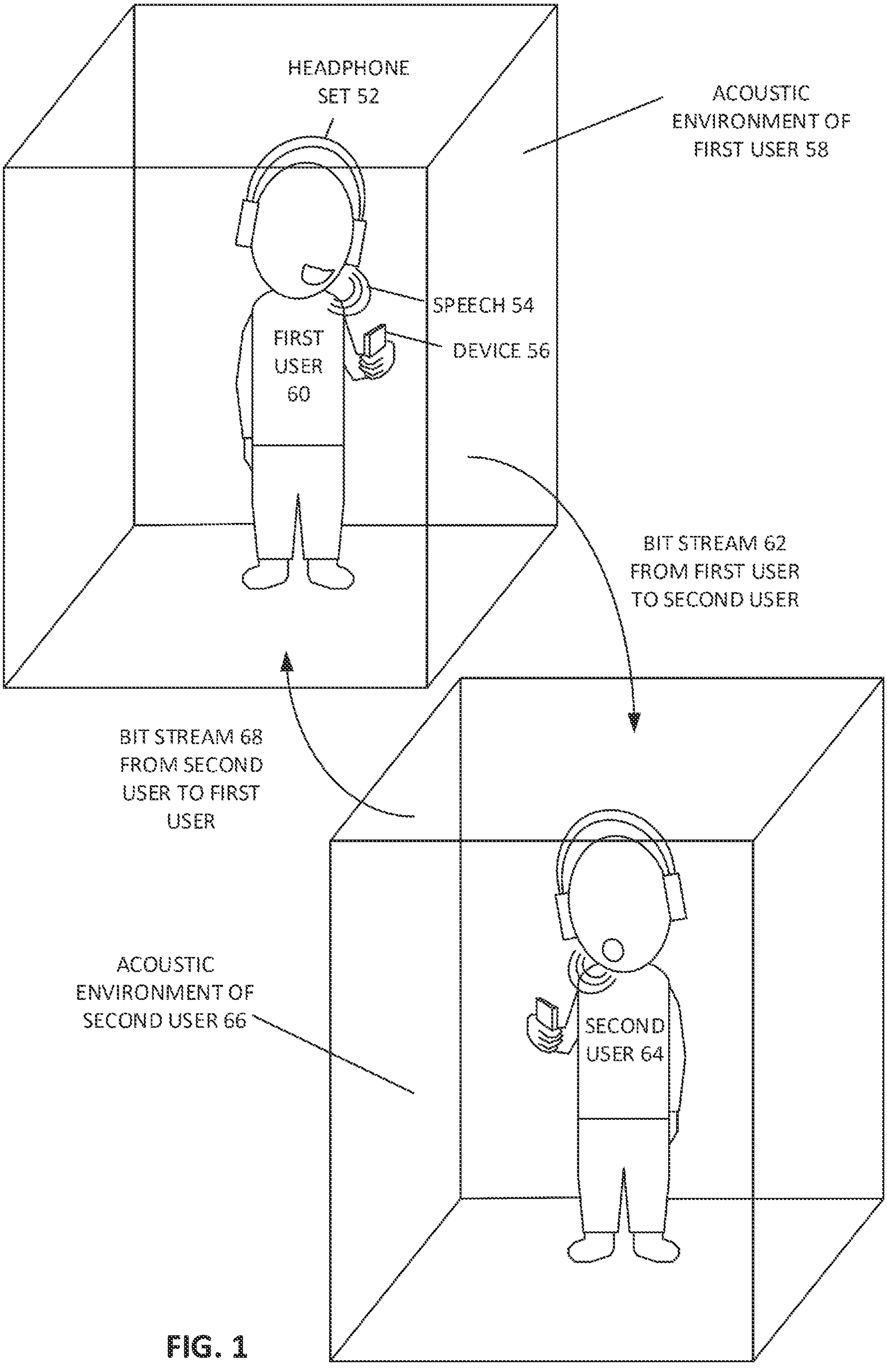
FIG. 1 illustrates an example multi-user audio processing system, in one aspect.

FIG. 1 illustrates an example of audio processing in a multi-user environment (e.g., an XR setting or videoconference). A first user 60 is located in a first acoustic environment 58, which can be indoors (e.g., a living room) or outdoors (e.g., a field or stadium). The first user has an audio system (e.g., capture device) that has a plurality of microphones. The capture device can include one or more of a headphone set 52, a mobile phone 56, a tablet computer, a laptop or desktop computer, a smart speaker, a camera, a head-mounted device with display and headphones, or other electronic device with microphones.

The first user can communicate (e.g., speak) to a second user 64 located in a second acoustic environment 66, the second user also having an audio system (e.g., a playback device) to receive a bit stream 62 sent by the first user. The first user and the second user are in different acoustic environments, for example, the first user can be in a living room and the second user can be in a field. In a multi-user application (such as an XR setting or a video teleconference), playback of the first user's speech to the second user can sound 'dry', when processed to remove reverberation and/or noise. Communicating ambient audio information (e.g., sounds other than speech in the first user's acoustic environment) to the second user can put a strain on communication systems due to bandwidth constraints, especially when wireless communication is used.

At the capture device, speech and ambience can be separately extracted from the microphone signals into independent audio signals, a clean speech signal and one or more ambience signals. The speech can be encoded at a first bit rate while ambience can be encoded at one or more bit rates that are lower than or equal to the first bit rate, however, at a higher compression level. The bit stream 62 can be communicated to the second user for playback. The second user's playback device can play the speech intelligibly at a higher bit rate and/or lower compression level while the ambience having a lower bit rate and/or higher compression level is played back simultaneously to provide an immersive experience for the second user.

Although the ambient sound is encoded at a lower bit rate and/or higher compression level, the reduction in quality is less noticeable because the speech of the first user/sender is the primary focus of the second user. The capture device of the sender can also determine acoustic data of the sender's environment such as reverberation time, early reflection patterns, and acoustic impulse responses of the user's environment. This acoustic data can be communicated to the second user and applied to the first user's speech so that the speech sounds less 'dry'. The size of this data can be far less than the data of the first user's speech, thus also preserving communication bandwidth while still providing an immersive environment.

A video stream can also be communicated between the users, simultaneous with the audio, as describe in other sections. The video stream can include video of a speaker or a computer generated 'avatar' which can be a graphical representation of the speaker. The video stream can also depict the speaker's acoustic environment. The speaker's speech can be processed (e.g., spatialized and/or reverberated) to match the XR setting, based on acoustic parameters or spatial parameters sent in metadata, e.g., from the first user to the second user.

It should be understood that the second user can similarly capture and process audio (e.g., speech and ambience) and communicate a bit stream 68 back to the first user using the same process described above in relation to the first user.

Figure 2:
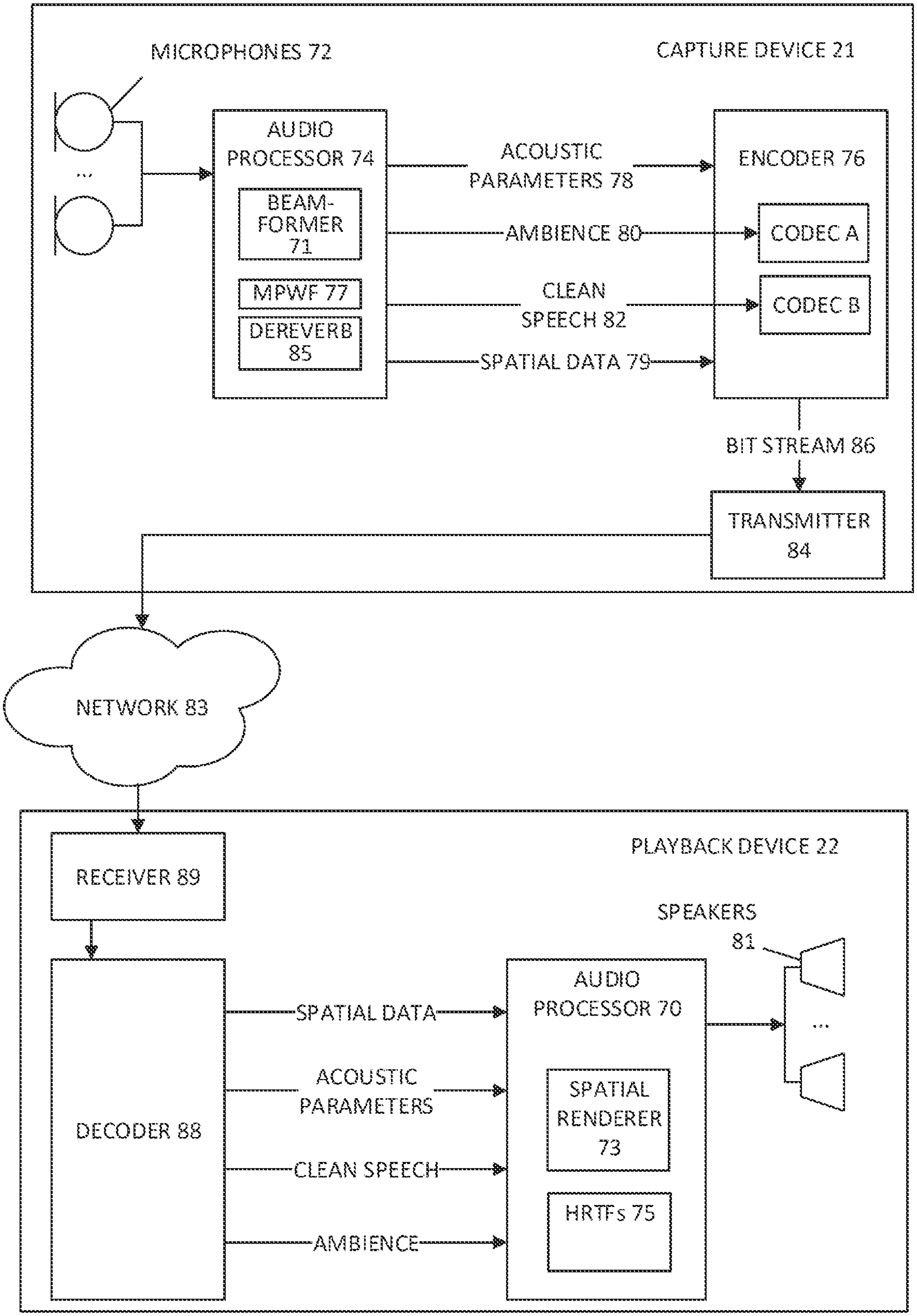
FIG. 2 illustrates a flow diagram of an audio processing system, in one aspect.

FIG. 2 show an audio systems and processes for processing audio to provide an immersive audio experience. A capture device 21 can have microphones 72 that form a microphone array with fixed and known positions. The microphones can sense sound in a physical environment and generate corresponding microphone signals. As mentioned, the capture device and play back device 22 can include one or more of a headphone set 52, a mobile phone 56, a tablet computer, a laptop or desktop computer, a smart speaker, a camera, a virtual reality head set with display and headphones, or other electronic device with microphones.

An audio processor 74 can extract clean speech from the microphone signals. The audio processor receives the microphone signals from the microphones 72 and extracts: a) clean speech of a user, and b) ambient sound. 'Ambient sound' here can be understood to include sounds in the user's physical environment other than the speech of the user, picked up by microphones 72. The clean speech 82 can be free of reverberant and ambient sound components. It should be understood that the audio processor can convert each of the microphone signals from analog to digital with an analog to digital converter, as known in the art. In addition, the audio signal processor can convert each of the digital microphone signals from the time domain to the frequency domain (e.g., short time Fourier transform, or other known frequency domain formats).

In one aspect, a Modified Perceptual Wiener Filter (MPWF) 77 can be used to separately extract the speech and ambient sound from the microphone signal. Additionally, or alternatively, a beamformer 71 can implement an adaptive beamforming algorithm to process the microphone signals to separately extract the speech and ambience. The beamformer can form an acoustic pick-up beam, from the microphone signals, focused at a location in the physical environment where the speech is emanating from (e.g., a speech source location). To determine the speech source location, in one aspect, a spatial beam can be focused in a target direction (which can be a predetermined 'guess' of where speech might be) and adapt (e.g., dynamically) in order to maximize or minimize a desired parameter, such as signal-to-interference-plus-noise ratio or signal to noise ratio (SNR). Other adaptive beamforming techniques can include least means square (LMS) error and/or sample matrix inversion (SMI) algorithm.

In one aspect, the audio processor 74 includes a dereverberator 85 that removes reverberant speech components. The dereverberator can be applied to the microphones signals or the clean speech signal to remove reverberant components of the speech picked up by the microphones.

The audio processor 74 can extract ambience from the microphone signals. In one aspect, extracting ambience 80 includes subtracting the clean speech from the microphone signals. By determining the clean speech, and then subtracting the clean speech from the microphone signals, the resulting signal or signals can contain only ambience (e.g., one or more ambient sounds or noise).

Alternative or additionally, the ambience can be extracted from the microphone signals by steering a null acoustic pick-up beam at a speech source location in the physical environment (e.g., a speaker's mouth). Sounds other than the speech in the acoustic environment (including reverberation, early reflections, noise, other speakers, etc.) picked up by microphones can be present in the ambience audio signal 80. An encoder 76 can encode, in bit stream 86, the clean speech and the ambience.

The clean speech is encoded at first bit rate and/or first compression level, and the ambience is encoded at a second bit rate and/or second compression level. The second bit rate is lower than or equal to the first bit rate. Additionally, or alternatively, the second compression level of the ambience is higher than the first compression level of the clean speech. The encoder can, for example, use different codecs (e.g., codec A and codec B) or compression algorithms for the clean speech and the ambience. The codec or algorithm that is applied to the ambience has a greater compression rate than the codec or algorithm that is applied to the clean speech. By using a higher compression level to encode ambience, more bandwidth can be allocated to clean speech where degradations in quality or resolution tend to be more noticeable to a listener.

In one aspect, the bit rate of the encoded clean speech is 128 kB/sec or greater. In one aspect, the bit rate of the encoded ambience is substantially lower than the encoded clean speech, for example, less than one tenth the bit rate of the encoded clean speech. Spatial codecs can have higher bit rates than speech codecs. Accordingly, ambience, if not compressed, can have a very high bit rate and put a strain on network bandwidth. In one aspect, the bit rate of encoded clean speech can be the same as ambience. Although the bit rates are the same or roughly similar, the encoded ambience is compressed at a higher level. For example, the encoded clean speech has a bit rate of 96 kB/sec and the encoded ambience, after compression at a higher level, has a bit rate of 96 kB/sec.

In one aspect, the audio processor 74 can determine, based on the microphone signals, one or more acoustic parameters 78 that characterize the acoustics of the physical environment. For example, the audio processor can determine, based on the microphone signals, a reverberation decay time (e.g., T60, T30, T20, etc.), a pattern of early reflections of sound in the physical environment, and/or one or more impulse responses (e.g., a binaural room impulse response) of the physical environment. The acoustic parameters can be encoded into the bit stream 86 and applied to the clean speech by a playback device.

In one aspect, audio processor of the capture device extracts and encodes clean speech and one or more acoustic parameters (e.g., a reverberation time, a pattern of early reflections, and/or one or more impulse responses of the physical environment) without extracting and encoding ambience signals. In other words, only the clean speech and acoustic parameters (and optionally, spatial data and video data) are encoded. This can further reduce bandwidth usage and allocate additional bandwidth to the clean speech (and/or a video) to be communicated.

In one aspect, the one or more acoustic parameters can by time-varying and change over time. The microphone signals can be continuously processed to generate new parameters as the capture device can move about in the same space (e.g., a room) or change spaces (e.g., from one room to another, or from inside a room to open space or vice-versa).

In one aspect, the microphones are integral to the capture device. The audio device processes sound from the microphone signals and encodes the audio information into a bit stream 86 that is transmitted to a second device (e.g., a playback device) with a transmitter 84, which can be wired or wireless, through any combination of communication protocols (e.g., Wi-Fi, Ethernet, TPC/IP, etc.).

In one aspect, the bit stream further includes spatial parameters/data 79. For example, the audio processor can use beamforming or other known localization algorithms utilizing time of arrival (TOA) and/or time difference of arrival (TDOA) to estimate a direction and/or a location of the speech or ambience sensed by the plurality of microphones 72. The spatial data can be encoded by the encoder and included in the bit stream. The spatial data can be applied to the clean speech by a playback device to spatially reproduce the speech at a virtual location during playback. In one aspect, the spatial data can be a predetermined setting, rather than being determined based on processing the audio signals. For example, the spatial data can be a predetermined setting that is associated to the clean speech so that the speech is spatialized and played back directly in front of a listener, regardless of where the clean speech originally emanated from.

A playback device 22 can have a receiver 89 that receives the bit stream over a network 83 or directly from the transmitter 84 of the capture device. In one aspect, the bit stream includes: a) an encoded speech signal containing speech sensed by a plurality of microphones in a physical environment, the encoded speech signal having a first compression level; b) an encoded ambient signal containing ambient sound sensed by the plurality of microphones in the physical environment, the encoded ambient signal having a second compression level that is higher than the compression level of the encoded speech signal; and c) one or more acoustic parameters of the physical environment. In one aspect, there is a plurality of ambient signals. It should be understood that 'ambient' and 'ambience' is used interchangeably in the present disclosure.

A decoder 88 can decode the encoded speech signal and the ambient signal. The one or more acoustic parameters, such as reverberation time or early reflections can be applied to the speech signal at block 70 to add a reverberation component to the speech signal so that the speech signal does not sound 'dry' when played back to a listener.

In one aspect, the one or more acoustic parameters includes one or more impulse responses (e.g., binaural room impulse responses (BRIRs)) and the impulse responses are applied to the decoded speech signal to spatialize the speech for playback through a left headphone speaker and a right headphone speaker of the plurality of speakers. In one aspect, the bit stream includes spatial data such as a location and/or direction of the speech. A spatial renderer 73 can apply one or more HRTFs 75 or impulse responses to the speech signal. The HRTFs or impulse responses can be selected or generated based on the location and/or direction of the speech, to spatialize the speech. Audio signals containing the spatialized speech can be used to drive speakers 81 (e.g., a left speaker and right speaker of a headphone set). Left and right speakers can be in-ear, over-ear, or on-ear speakers. The headphone set can be sealed or open. It should be understood that HRTF and impulse response are interchangeable in the present disclosure, HRTFs being applicable in the frequency domain while impulse responses are applicable in the time domain, and processing of audio with respect to the present disclosure can be performed in either time domain or frequency domain.

Figure 3:
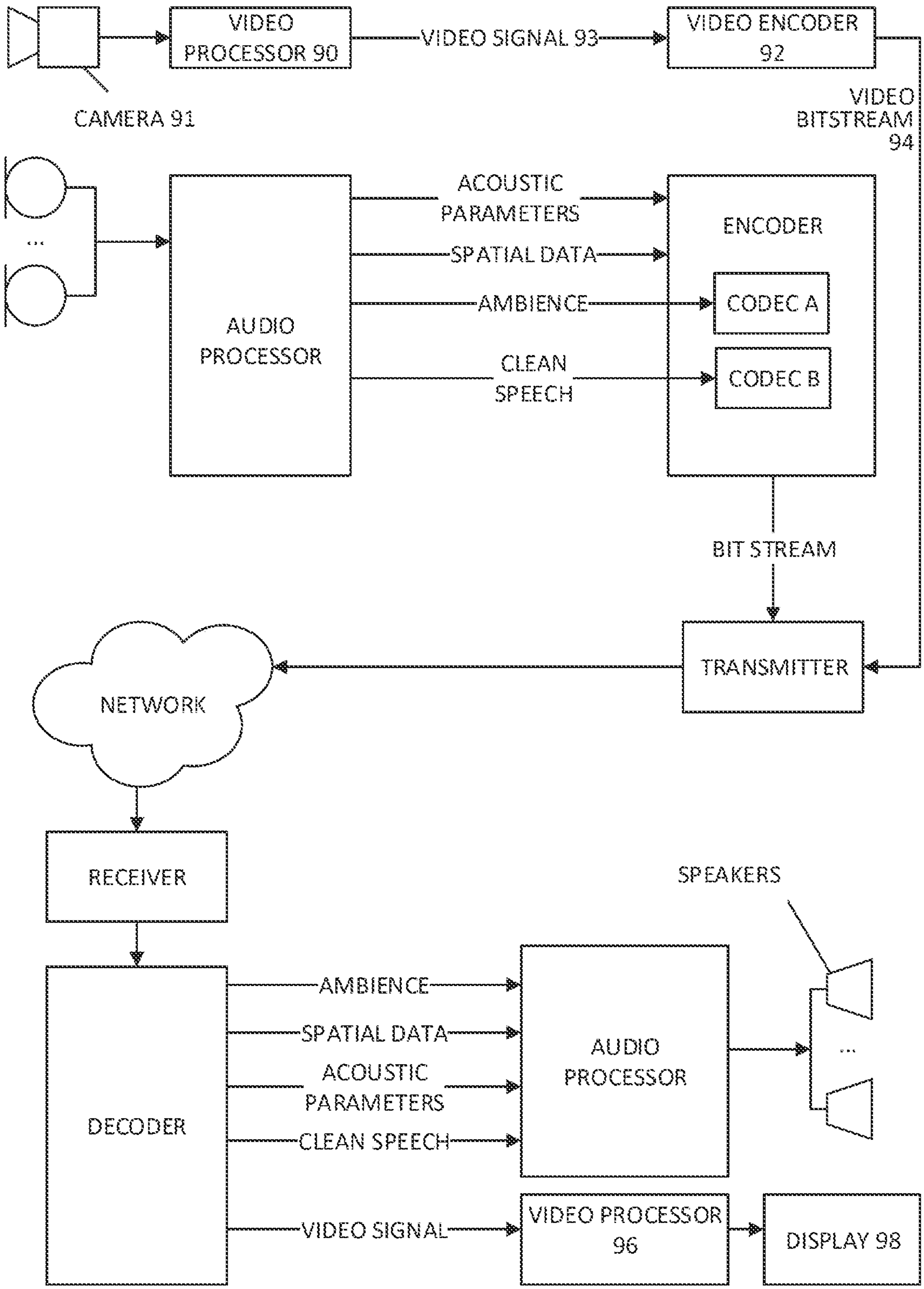
FIG. 3 illustrates a flow diagram of an audio processing system with camera and video processing, in one aspect.

In one aspect, a visual representation of a speaker that is coordinated with the clean speech is generated and communicated with the clean speech. For example, as shown in FIG. 3, a camera 91 can generate one or more images such as a video stream. The video stream can include a visual representation of a speaker/sender. The video processor 90 can generate a virtual representation of the user (e.g., a computer generated model or 'avatar') that mimics movements (e.g., mouth movements) of the speaker in a video signal 93. Alternatively, the video signal 93 can simply contain a real-life video stream of the user captured by the camera 91.

The spatial data can include a location (x, y, and z) and/or direction (e.g., roll, pitch, and yaw) of the speech. A video encoder 92 can encode the video stream and transmit the stream to a listener for playback. During playback, the clean speech can be spatialized using the location and/or direction of the speech. Simultaneously, a video processor 96 can render a video stream onto a display 98 of the playback device. The video stream can include the avatar or real-life depiction of the speaker, as well as the speaker's acoustic environment (e.g., in the background or foreground). The speech is temporally and spatially coordinated with the rendering of the avatar or real-depiction of the speaker during playback, thereby providing an immersive XR experience or teleconference experience.

For example, referring back to FIG. 1, first user 60 can have a device 56 with a camera that captures a video stream of the first user speaking, along with the acoustic environment of the first user 58 in the background, which happens to be in an auditorium. Microphones on device 56 or headphone set 52 can generate microphone signals that sense the first user's speech. The speech is extracted and encoded at a first compression level, and ambient sounds are extracted and encoded at a second compression level higher than the first compression level. Spatial data associated with the speech can be determined based on the microphone signals (e.g., through beamforming, TOA and/or TDOA) and/or based on the video stream (for example, using object recognition, computer vision, and/or trained neural networks to recognize a user's face and mouth movements). A real life depiction of the first user, or a computer generated avatar can be sent to the second user.

Using object recognition, computer vision, facial recognition and/or trained neural networks, an avatar can be generated and animated to match movements of the user (e.g., mouth movements) so that the avatar appears to be speaking. The avatar or real life depiction can be played back to the second user simultaneous with the speech from the first user. The playback device of the second user, which can be a combination of a mobile device and a headset or a virtual reality display with headphones, can render the video and audio bit streams. The first user's speech can be spatially rendered with a virtual location and/or direction that matches the mouth location and/or speaking direction of the avatar or real-life depiction (e.g., in an XR environment).

In one aspect the one or more acoustic parameters are determined based on a) one or more images of the physical environment, and b) measured reverberation of the physical environment based on the plurality of microphone signals.

Figure 4:
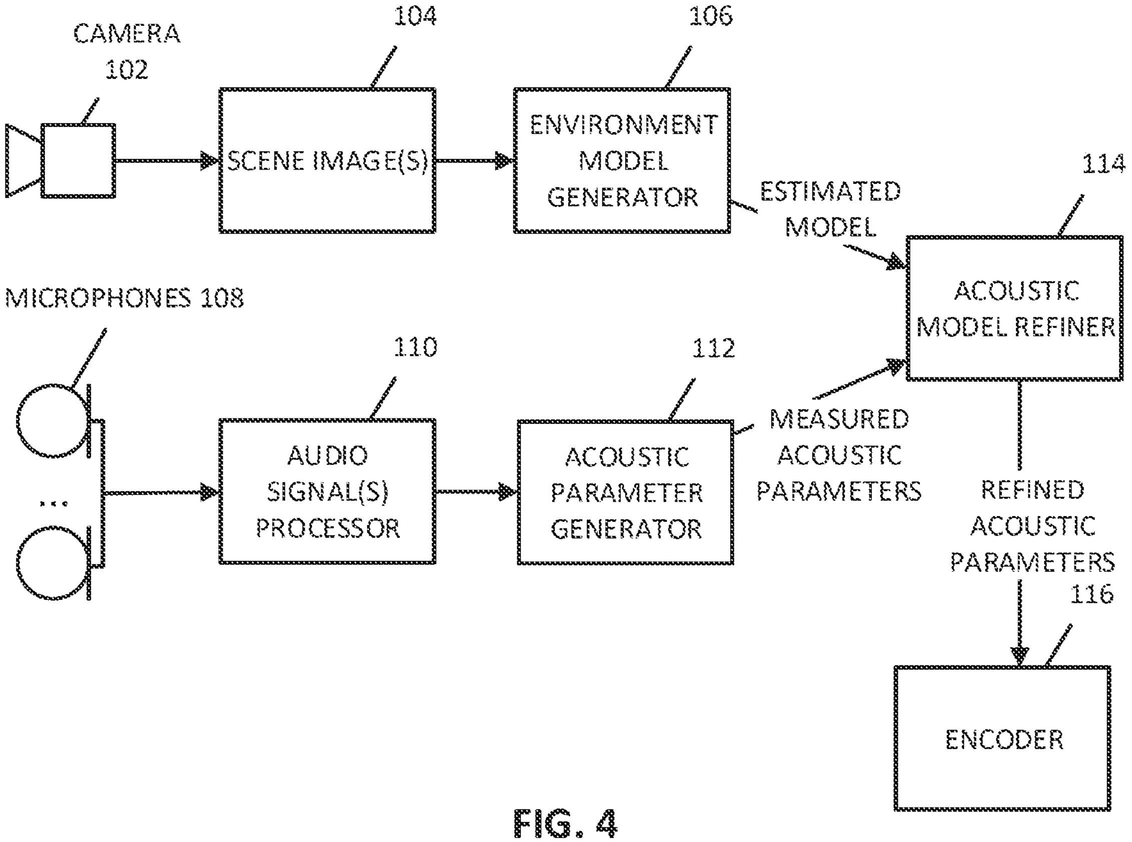
FIG. 4 illustrates a flow diagram of an audio processing system for generating acoustic parameters based on camera and microphone data, in one aspect.

For example, FIG. 4 shows a system and process that can generate acoustic parameters based on one or more images 104 of a physical environment captured by a camera 102 and measured acoustic parameters (e.g., reverberation, early reflections, impulse responses) sensed by microphones 108 of the same physical environment. As discussed, an extended reality environment can include spatialized sound and, optionally, a visual component with virtual content rendered with images that depict the physical environment.

A camera 102 generates one or more scene images 104 of the physical environment. An environmental model generator 22 generates, based on the one or more scene images, an estimated model of the physical environment. The estimated model can include a three dimensional space representation of the physical environment, and one or more environmental parameters of the physical environment such as one or more acoustic surface material parameters and/or scattering parameters of the room and detected objects. The environmental parameters can be frequency dependent, e.g., different parameters can be estimated to correspond to different frequencies. The estimated model can be stored in known data structures, for example, as a voxel grid or a mesh data structure. Acoustic surface material parameters can include sound absorption parameters that are dependent on a material (e.g., a surface material) of a surface, object or room. Scattering parameters of a surface or object can be a geometrical property based on or influenced by the size, structure, and/or shape of a surface or object. The estimated model can therefore include a physical room geometry as well as objects detected in the physical environment and environmental parameters of the room and the objects.

The estimated model can be generated through computer vision techniques such as object recognition. Trained neural networks can be utilized to recognize objects and material surfaces in the image. Surfaces can be detected with 2D cameras that generate a two dimensional image (e.g., a bitmap). 3D cameras (e.g., having one or more depth sensors) can also be used to generate a three dimensional image with two dimensional parameters (e.g., a bitmap) and a depth parameter. Thus, camera 102 can be a 2D camera or a 3D camera. Model libraries can be used to define identified objects in the scene image.

One or more microphone arrays 108 can capture audio signals that capture one or more sounds (e.g., ambience and speech) in the physical environment. An audio signal processor 110 can convert each of the audio signals from analog to digital with an analog to digital converter, as known in the art. In addition, the audio signal processor can convert each of the digital audio signals from the time domain to the frequency domain. An acoustic parameter generator 112 (e.g., a computer estimator) can generate one or more acoustic parameters of the physical environment such as, but not limited to, reverberation decay time, early reflection patterns, or a direct to reverberant ratio (DRR).

In one aspect, the one or more acoustic parameters of the physical environment are generated corresponding to one or more frequency ranges of the audio signals. In this manner, each frequency range (for example, a frequency band or bin) can have a corresponding parameter (e.g. a reverberation characteristic, decay rate, or other acoustic parameters mentioned). Parameters can be frequency dependent.

An acoustic model refiner 114 can refine the estimated model by modifying and/or generating one or more acoustic surface material parameters and/or scattering parameters of the estimated model based on the measured acoustic parameters, resulting in an updated model of the physical environment. In this manner, the estimated model, being based on the camera images, can also have acoustic surface material parameters (e.g., sound absorption, scattering, or sound reduction parameters) that are improved or optimized (e.g., increased or decreased) to more closely match the measured acoustic parameters of the physical environment. For example, the processing can include modifying the acoustic surface material parameters of the estimated model by increasing or decreasing one or more of the acoustic surface material parameters based on comparing an estimated or simulated acoustic response of the estimated model with the measured acoustic parameters of the environment. Thus, the system can improve acoustic parameters of the model (e.g., scattering characteristics/parameters, acoustic absorption coefficients, reverberation time, early reflection patterns, and/or sound reduction parameters of an object in the model) by tuning these parameters based on microphone signals sensing sound in the physical environment.

An encoder 116 can encode the estimated model and/or the improved acoustic parameters and include this in a bit stream to be communicated to listener. This bit stream can also include clean speech of the user (as shown in FIG. 2 and FIG. 3), and optionally, ambience, where the ambience is compressed to a lower bit rate and/or at a higher compression level than the clean speech in the bit stream. In one aspect, the acoustic model refiner can select or generate one or more impulse responses based on the updated model.

The improved acoustic parameters which can include the three dimensional model of the physical environment, the scattering parameters, acoustic absorption coefficients, reverberation time, early reflection patterns, and/or one or more impulse responses, can be encoded at block 116 and communicated to a listener for playback. This information can form the 'acoustic parameters' and 'spatial data' shown in FIGS. 2 and 3. A playback device can convolve the speech signal with the one or more impulse responses to generate spatialized output audio channels so that the speakers that are driven with the audio channels can generate sound (e.g., the speech) will appear to emanate from a target location in a XR environment.

In one aspect, the output audio channels drive the speakers in synchronism with a virtual visual object rendered on the image (e.g., an avatar), and the virtual location of the virtual sound source corresponds to a visual location of the virtual visual object rendered on the image in the virtualized environment.

In one aspect, the virtual visual object can be rendered with the image to generate a virtual visual environment encoded in data; and a display can be driven with the data of the virtual visual environment. A capture device such as a tablet computer or a smart phone can have multiple cameras in front and the back, as well as a display. Thus, in some cases, a front facing camera can generate video of a user speaking while a back facing camera can generate video of the physical environment of the user.

Figure 5:
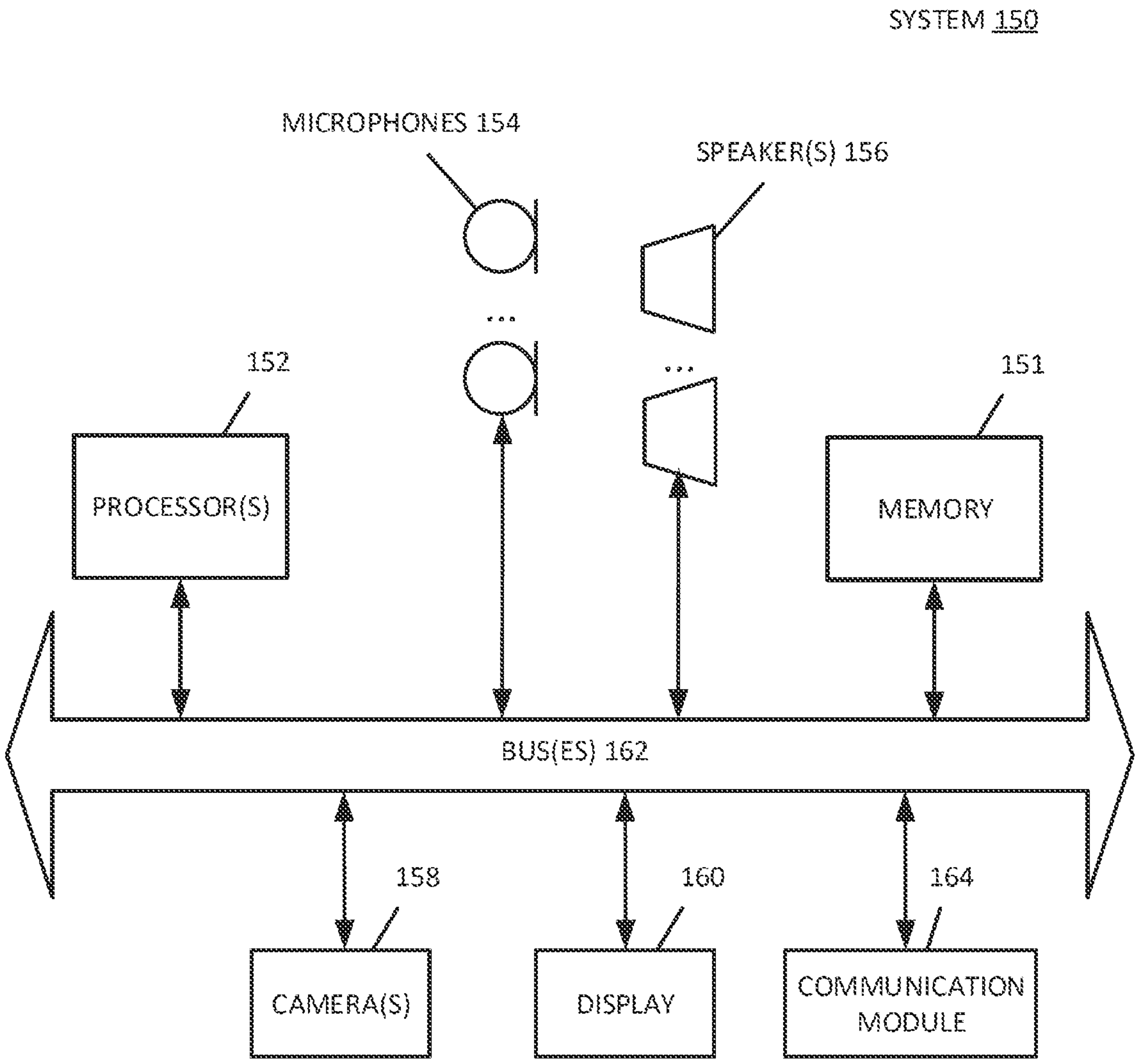
FIG. 5 illustrates an example implementation of an audio system having a programmed processor.

FIG. 5 shows a block diagram of audio processing system hardware, in one aspect, which may be used with any of the aspects described herein. This audio processing system can represent a general purpose computer system or a special purpose computer system. Note that while FIG. 5 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 5 is not intended to represent any particular architecture or manner of interconnecting the components as such details are not germane to the aspects herein. It will also be appreciated that other types of audio processing systems that have fewer components than shown or more components than shown in FIG. 5 can also be used. Accordingly, the processes described herein are not limited to use with the hardware and software of FIG. 5.

As shown in FIG. 5, the audio processing system 150 (for example, a laptop computer, a desktop computer, a mobile phone, a smart phone, a tablet computer, a smart speaker, a head mounted display (HMD), or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art.

Memory, although not shown in FIG. 5, can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.) can be performed by a networked server in communication with the capture device. The audio system can include one or more cameras 158 and a display 160.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system. For example, the various processing blocks in FIGS. 2-4 can be implemented in a variety of hardware and/or software.

In the description, certain terminology is used to describe features of various aspects. For example, in certain situations, the terms "analyzer", "separator", "renderer", "estimator", "encoder", "decoder", "receiver", "transmitter", "refiner", "combiner", "synthesizer", "component," "unit," "module," and "logic", "extractor", "subtractor", "generator", "optimizer", "processor", and "simulator" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method performed by an audio device, comprising:

receiving, in a bit stream, a) an encoded speech signal containing speech sensed by a plurality of microphones in a physical environment, the encoded speech signal compressed to have a first bit rate, b) an encoded ambient signal containing ambient sound sensed by the plurality of microphones in the physical environment, the encoded ambient signal is compressed to have a second bit rate that is lower than the first bit rate; and c) one or more acoustic parameters of the physical environment;

decoding the encoded speech signal and the encoded ambient signal; and applying the one or more acoustic parameters to a decoded speech signal for playback through a plurality of speakers.

2. The method of claim 1, wherein the one or more acoustic parameters includes one or more binaural room impulse responses (BRIRs).

3. The method of claim 2, wherein the BRIRs are applied to the decoded speech signal to spatialize the speech for playback through a left headphone speaker and a right headphone speaker of the plurality of speakers.

4. The method of claim 1, wherein the one or more acoustic parameters includes a reverberation time or a pattern of early reflections of the physical environment.

5. The method of claim 1, wherein applying the one or more acoustic parameters to the decoded speech signal generates a speech signal with a reverberant component for playback through the plurality of speakers.

6. The method of claim 1, wherein the audio device includes a plurality of microphones that are integral to the audio device; the audio device being one or more of: a head-worn device, a mobile device with a display, a smart speaker, or a virtual reality headset; and the bit stream is received from another audio device through a communication protocol.

7. The method of claim 6, wherein the audio device has a wireless transmitter, and the communication protocol is a wireless communication protocol.

8. The method of claim 1, wherein the one or more acoustic parameters includes a reverberation decay time or a pattern of early reflections of the physical environment.

9. The method of claim 1, wherein the one or more acoustic parameters includes one or more impulse responses of the physical environment.

10. A non-transitory computer readable medium storing instructions operable to cause one or more processors to perform operations, comprising:

receiving, in a bit stream, a) an encoded speech signal containing speech sensed by a plurality of microphones in a physical environment, the encoded speech signal is compressed to have a first bit rate, b) an encoded ambient signal containing ambient sound sensed by the plurality of microphones in the physical environment, the encoded ambient signal is compressed to have a second bit rate that is lower than the first bit rate; and c) one or more acoustic parameters of the physical environment;

decoding the encoded speech signal and the encoded ambient signal; and applying the one or more acoustic parameters to a decoded speech signal for playback through a plurality of speakers.

11. The non-transitory computer readable medium storing instructions of claim 10, the operations further comprising:

decoding, from the bit stream, one or more spatial parameters associated with a) the ambient sound, or b) the speech, the one or more spatial parameters defining spatial locations of the ambient sound or the speech in the physical environment; and applying the one or more spatial parameters to a decoded ambient signal or the decoded speech signal.

12. The non-transitory computer readable medium storing instructions of claim 10, wherein a bit rate of the encoded speech signal is 96 KB/sec or greater.

13. The non-transitory computer readable medium storing instructions of claim 10, wherein a bit rate of the encoded ambient signal is less than one tenth of a bit rate of the encoded speech signal.

14. The non-transitory computer readable medium storing instructions of claim 10, wherein the encoded speech signal does not contain reverberant or ambient sound components.

15. The non-transitory computer readable medium storing instructions of claim 10, the operations further comprising:

rendering a video stream onto a display of an audio device, the video stream including an avatar or real-life depiction of a speaker and the physical environment.

16. An audio device, comprising: a plurality of microphones that form a microphone array that generate a plurality of microphone signals representing sound sensed in a physical environment; and one or more processors configured to: extract clean speech from the plurality of microphone signals; extract ambience from the plurality of microphone signals; determine, based on the plurality of microphone signals, one or more acoustic parameters of the physical environment, wherein the one or more acoustic parameters include one or more of: a reverberation time, a pattern of early reflections, or one or more impulse responses of the physical environment; and encode, in a bit stream a) the clean speech by compressing the clean speech into an encoded speech signal at a first bit rate,) the ambience by compressing the ambience into an encoded ambience signal at a second bit rate that is lower than the first bit rate, and c) the one or more acoustic parameters of the physical environment, the one or more acoustic parameters encoded to be applied to the clean speech by a receiving device.

17. The audio device of claim 16, wherein the plurality of microphones is integral to the audio device being a head-worn device, a mobile device with display, a smart speaker, or a virtual reality headset, and wherein the audio device is to transmit the bit stream to a second device through a wireless communication protocol.

18. The audio device of claim 16, wherein the clean speech does not contain reverberant or ambient sound components.

19. The audio device of claim 16, wherein the one or more impulse responses includes a binaural room impulse response (BRIR).

20. The audio device of claim 16, wherein the one or more acoustic parameters are determined based on a) one or more images of the physical environment, and b) measured reverberation of the physical environment based on the plurality of microphone signals.

* * * * *